United States Patent
Oshiumi et al.

(10) Patent No.: US 12,509,570 B2
(45) Date of Patent: Dec. 30, 2025

(54) METAL-CONTAINING ADDITIVE, CROSSLINKABLE POLYMER COMPOSITION, CROSSLINKED POLYMER MATERIAL, METAL MEMBER, AND WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); KYUSHU UNIVERSITY, NATIONAL UNIVERSITY CORPORATION, Fukuoka (JP)

(72) Inventors: Naoyuki Oshiumi, Yokkaichi (JP); Takehiro Hosokawa, Yokkaichi (JP); Makoto Mizoguchi, Fukuoka (JP)

(73) Assignees: AUTONETWORKS TECHNOLOGIES, LTD., Mie (JP); SUMITOMO WIRING SYSTEMS, LIMITED, Mie (JP); SUMITOMO ELECTRIC INDUSTRIES, LTD., Osaka (JP); KYUSHU UNIVERSITY, NATIONAL UNIVERSITY CORPORATION, Fukuoka (JP)

(*) Notice: Subject to any disclaimer, the term of this patent is extended or adjusted under 35 U.S.C. 154(b) by 338 days.

(21) Appl. No.: 18/038,141
(22) PCT Filed: Dec. 2, 2021
(86) PCT No.: PCT/JP2021/044193
§ 371 (c)(1),
(2) Date: May 22, 2023
(87) PCT Pub. No.: WO2022/124174
PCT Pub. Date: Jun. 16, 2022

(65) Prior Publication Data
US 2023/0407046 A1 Dec. 21, 2023

(30) Foreign Application Priority Data
Dec. 11, 2020 (JP) .................. 2020-205528

(51) Int. Cl.
*C08K 5/00* (2006.01)
*C08K 5/05* (2006.01)
(Continued)

(52) U.S. Cl.
CPC .............. *C08K 5/0091* (2013.01); *C08K 5/05* (2013.01); *C09D 7/63* (2018.01); *H01B 7/0045* (2013.01);
(Continued)

(58) Field of Classification Search
None
See application file for complete search history.

(56) References Cited

U.S. PATENT DOCUMENTS

| 2002/0022700 A1 | 2/2002 | Chino et al. |
| 2002/0086952 A1 | 7/2002 | Chino et al. |

(Continued)

FOREIGN PATENT DOCUMENTS

| JP | H05-106045 A | 4/1993 |
| JP | H05-239292 A | 9/1993 |

(Continued)

OTHER PUBLICATIONS

Kondo—JP H11-235872 A—PCT D5—MT—image forming material—1999 (Year: 1999).*

(Continued)

*Primary Examiner* — John Vincent Lawler
(74) *Attorney, Agent, or Firm* — Oliff PLC (57) ABSTRACT

To provide a metal-containing additive and a crosslinkable polymer composition that each contain a β-diketonato metal complex and have excellent storage stability, and provide a crosslinked polymer material, a metal member, and a wire harness that are each produced using such a crosslinkable polymer composition. The metal-containing additive includes the β-diketonato metal complex and a primary alkyl (Continued)

alcohol having 4 to 30 carbon atoms. The crosslinkable polymer composition includes the metal-containing additive and an organic polymer, where the organic polymer has a substituent capable of forming ionic bonds with metal ions released by heat from the metal-containing additive.

18 Claims, 4 Drawing Sheets

(51) Int. Cl.
    C09D 7/63      (2018.01)
    H01B 7/00      (2006.01)
    H01B 7/28      (2006.01)
(52) U.S. Cl.
    CPC ..... H01B 7/2806 (2013.01); C08K 2201/014 (2013.01)

(56) References Cited

U.S. PATENT DOCUMENTS

| | | | |
|---|---|---|---|
| 2004/0010090 A1 | 1/2004 | Chino et al. | |
| 2004/0029990 A1 | 2/2004 | Fujita et al. | |
| 2007/0225449 A1 | 9/2007 | Kanae et al. | |
| 2008/0254216 A1 | 10/2008 | Kadota et al. | |
| 2009/0087667 A1 | 4/2009 | Tomizaki et al. | |
| 2010/0256027 A1 | 10/2010 | Miyamoto et al. | |
| 2014/0378612 A1 | 12/2014 | Dinkar et al. | |
| 2015/0291834 A1 | 10/2015 | Isotani et al. | |
| 2017/0062954 A1 | 3/2017 | Hase et al. | |
| 2017/0190876 A1 | 7/2017 | Kagumba et al. | |
| 2017/0243673 A1 | 8/2017 | Nakashima et al. | |
| 2017/0313918 A1 | 11/2017 | Kasahara et al. | |
| 2019/0106652 A1 | 4/2019 | Takata et al. | |
| 2019/0143730 A1* | 5/2019 | Kuse | G03F 7/20 101/451 |
| 2020/0332100 A1 | 10/2020 | Ashihara et al. | |
| 2020/0392350 A1 | 12/2020 | Oshiumi et al. | |
| 2021/0032454 A1 | 2/2021 | Nakashima et al. | |
| 2022/0242981 A1 | 8/2022 | Aoki et al. | |
| 2023/0265263 A1 | 8/2023 | Oshiumi et al. | |
| 2023/0399525 A1 | 12/2023 | Oshiumi et al. | |
| 2024/0343843 A1 | 10/2024 | Sato et al. | |
| 2024/0352161 A1 | 10/2024 | Sato et al. | |
| 2024/0392074 A1 | 11/2024 | Sato et al. | |

FOREIGN PATENT DOCUMENTS

| | | | | |
|---|---|---|---|---|
| JP | H07-041636 A | | 2/1995 | |
| JP | H11235872 A | * | 8/1999 | ............. B41M 5/26 |
| JP | H11314672 A | * | 11/1999 | ............. B32B 27/20 |
| JP | 2000-212359 A | | 8/2000 | |
| JP | 2001-342305 A | | 12/2001 | |
| JP | 2002-20579 A | | 1/2002 | |
| JP | 2004-51814 A | | 2/2004 | |
| JP | 2005054087 A | * | 3/2005 | ............. C08K 3/04 |
| JP | 2006-083361 A | | 3/2006 | |
| JP | 3958201 B2 | | 8/2007 | |
| JP | 2008-163239 A | | 7/2008 | |
| JP | 2010-92782 A | | 4/2010 | |
| JP | 2010-096416 A | | 4/2010 | |
| JP | 2010092782 A | * | 4/2010 | ............. H01L 31/04 |
| JP | 2011-162673 A | | 8/2011 | |
| JP | 2015-086281 A | | 5/2015 | |
| JP | 2015-106141 A | | 6/2015 | |
| JP | 2016-050288 A | | 4/2016 | |
| JP | 2018-080327 A | | 5/2018 | |
| JP | 2020-033429 A | | 3/2020 | |
| JP | 2020-161398 A | | 10/2020 | |
| JP | 2020-164837 A | | 10/2020 | |
| WO | 2005/087697 A1 | | 9/2005 | |
| WO | 2014/057858 A1 | | 4/2014 | |
| WO | 2016/067891 A1 | | 5/2016 | |
| WO | 2017/117499 A1 | | 7/2017 | |
| WO | 2017/204046 A1 | | 11/2017 | |
| WO | 2019/163613 A1 | | 8/2019 | |
| WO | 2019/189723 A1 | | 10/2019 | |
| WO | 2021/193811 A1 | | 9/2021 | |
| WO | 2022/102423 A1 | | 5/2022 | |
| WO | 2023/032899 A1 | | 3/2023 | |
| WO | 2023/032900 A1 | | 3/2023 | |
| WO | 2023/053889 A1 | | 4/2023 | |

OTHER PUBLICATIONS

Kuroda—JP H11-314672 A—PCT D3—OG—lidded container—1999 (Year: 1999).*
Suzuki—JP 2005-054087 A—PCT D4—MT—conductive polyamide—2005 (Year: 2005).*
Amano—JP 2010-092782 A—PCT D2+CN D1—MT—metal oxide dispersion—2010 (Year: 2010).*
PubChem—Bis(acetylacetonato)titanium oxide—accessed Jun. 16, 2025 (Year: 2025).*
Jan. 28, 2025 Office Action issued in Japanese Patent Application No. 2023-545548.
Jan. 28, 2025 Office Action issued in Japanese Patent Application No. 2023-545549.
Jul. 2, 2024 Office Action Issued in Japanese Patent Application No. 2022-568223.
Apr. 4, 2024 Office Action issued in Chinese Patent Application No. 202180082057.9.
Feb. 22, 2022 International Search Report issued in International Patent Application No. PCT/JP2021/044193.
Brahma, S. et al. "Zinc acetylacetonate hydrate adducted with nitrogen donor ligands: Synthesis, spectroscopic characterization, and thermal analysis". Journal of Molecular Structure, 1101 (2015) 41-49.
Purkayastha, D.D. et al. "Surfactant controlled low-temperature thermal decomposition route to zinc oxide hanorods from zinc(II) acetylacetonate monohydrate". Journal of Luminescence, 154 (2014) 36-40.
May 18, 2021 Search Report issued in International Patent Application No. PCT/JP2021/012501.
Dec. 9, 2021 International Preliminary Report on Patentability issued in International Patent Application No. PCT/JP2021/012501.
Oct. 17, 2023 Office Action issued in Japanese Patent Application No. 2020-058326.
Oct. 18, 2022 Search Report issued in International Patent Application No. PCT/JP2022/032375.
U.S. Appl. No. 18/682,344, filed Feb. 8, 2024 in the name of Sato et al.
U.S. Appl. No. 17/914,182 filed Sep. 23, 2022 in the name of Oshiumi et al.
Dec. 21, 2021 Search Report issued in International Patent Application No. PCT/JP2021/039800.
U.S. Appl. No. 18/033,856, filed Apr. 26, 2023 in the name of Oshiumi et al.
Oct. 18, 2022 Search Report issued in International Patent Application No. PCT/JP2022/032374.
U.S. Appl. No. 18/682,368, filed Feb. 8, 2024 in the name of Sato et al.
Jun. 4, 2025 Notice of Allowance issued in U.S. Appl. No. 17/914,182.
Jun. 11, 2025 Notice of Allowance issued in U.S. Appl. No. 18/033,856.
U.S. Appl. No. 19/154,935, filed Aug. 8, 2025 in the name of Sato et al.
U.S. Appl. No. 19/155,016, filed Aug. 8, 2025 in the name of Sato et al.
Jul. 24, 2025 Office Action issued in German Patent Application No. 11 2022 003 181.6.
Jul. 24, 2025 Office Action issued in German Patent Application No. 11 2022 003 180.8.
Mar. 26, 2024 Search Report issued in International Patent Application No. PCT/JP2024/004777.

(56) References Cited

OTHER PUBLICATIONS

Mar. 26, 2024 Search Report issued in International Patent Application No. PCT/JP2024/004778.

* cited by examiner

FIG. 4

METAL-CONTAINING ADDITIVE, CROSSLINKABLE POLYMER COMPOSITION, CROSSLINKED POLYMER MATERIAL, METAL MEMBER, AND WIRE HARNESS

TECHNICAL FIELD

The present disclosure relates to a metal-containing additive, a crosslinkable polymer composition, a crosslinked polymer material, a metal member, and a wire harness.

BACKGROUND ART

The β-diketonato metal complexes are widely used as raw materials for manufacturing various materials. For example, as described in PTL1 and PTL2, a β-diketonato metal complex is preferably used as a raw material for forming a metal oxide thin film by a chemical vapor deposition (CVD) process. A chemical structure of the β-diketonato metal complex is investigated so that the β-diketonato metal complex has properties suitable for its application.

For example, PTL1 discloses that a β-diketonato metal complex having an alkoxyalkylmethyl group is used from the viewpoint of providing a metal complex having a low melting point, excellent in stability against moisture, air, and heat, and suitable for metal thin-film formation by the CVD process. PTL2 discloses a metal acetylacetonato complex for oxide thin film formation, including a metal complex with acetylacetone as a ligand and an adduct of ortho-phenanthroline derivative or an adduct of 2,2'-bipyridyl derivative from the viewpoint of lowering vaporization temperature and making the complex to be suitable as a material for oxide thin-film formation.

CITATION LIST

Patent Literature

PTL1: International Publication WO 2005/087697 PTL2: JP H05-106045 A.

Non-Patent Literature

NPTL1: S. Brahma, et. al., "Zinc acetylacetonate hydrate adducted with nitrogen donor ligands: Synthesis, spectroscopic characterization, and thermal analysis", Journal of Molecular Structure 1101 (2015), 41-49.
NPTL2: D. D. Purkayastha et al., "Surfactant controlled low-temperature thermal decomposition route to zinc oxide nanorods from zinc(II) acetylacetonate monohydrate", Journal of Luminescence 154 (2014), 36-40.

SUMMARY OF INVENTION

Technical Problem

When a β-diketonato metal complex is used as a raw material for film formation by a CVD process or the like, it can be said that a material which melts or vaporizes at a somewhat low temperature is preferable, as described in PTL 1 and PTL 2. On the other hand, when the β-diketonato metal complex is used for applications other than the raw material for film formation, it is not always preferable that the β-diketonato metal complex undergoes a change, such as melting or vaporization, at low temperature. For example, in a possible application, metal ions are released from the β-diketonato metal complex by thermal decomposition or phase transition and used as a metal ion source. In such a case, the β-diketonato metal complex preferably stably holds its structure and does not easily undergo a change, such as decomposition, at the stage of storage or material preparation before performing heating to release the metal ions. In other words, the β-diketonato metal complex preferably has high storage stability.

The problem to be solved by the disclosure is to provide a metal-containing additive and a crosslinkable polymer composition, which each include a β-diketonato metal complex and have excellent storage stability, and provide a crosslinked polymer material, a metal member, and a wire harness that are each produced using such a crosslinkable polymer composition.

Solution to Problem

The metal-containing additive according to the disclosure includes a β-diketonato metal complex and a primary alkyl alcohol having 4 to 30 carbon atoms.

The crosslinkable polymer composition according to the disclosure includes the metal-containing additive and an organic polymer, where the organic polymer has a substituent capable of forming ionic bonds with metal ions released by heat from the metal-containing additive.

The crosslinked polymer material according to the disclosure is a crosslinked product of the crosslinkable polymer composition, where the organic polymer is crosslinked via the metal ions released from the metal-containing additive.

The metal member according to the disclosure includes a metal base and a coating material covering a surface of the metal base, where the coating material is composed of the crosslinked polymer material.

The wire harness according to the disclosure includes the crosslinked polymer material.

Advantageous Effects of Invention

The metal-containing additive and the crosslinkable polymer composition according to the disclosure each contain a β-diketonato metal complex and have excellent storage stability. The crosslinked polymer material, the metal member, and the wire harness according to the disclosure are each produced using such a crosslinkable polymer composition.

DESCRIPTION OF EMBODIMENT

Description of Embodiments of the Disclosure

First, embodiments of the disclosure are listed and described.
A metal-containing additive according to the disclosure includes a β-diketonato metal complex and a primary alkyl alcohol having 4 to 30 carbon atoms.

The inventors have found that a complex structure of the β-diketonato metal complex is stabilized by adding a primary alkyl alcohol having 4 to 30 carbon atoms to the β-diketonato metal complex. Stabilizing the complex structure can enhance storage stability of the β-diketonato metal complex compared to a case where no alkyl alcohol is added. In other words, the β-diketonato metal complex can be stored stably for a long period at a relatively low temperature such as room temperature. While the metal-containing additive contains the β-diketonato metal complex and is thus probably used as, for example, an additive for metal-crosslinking of an organic polymer through releasing metal ions by heating, the additive has high storage stability and thus can be stably held so as not to release the metal ions during storing the additive before use, or during material preparation such as mixing of a composition.

The alkyl alcohol is preferably a linear alkyl alcohol. In that case, the effect of stabilizing the complex structure of the β-diketonato metal complex is high, making it possible to effectively enhance storage stability of the metal-containing additive and of the composition containing the metal-containing additive.

The amount of the alkyl alcohol is preferably twice or more the amount of the β-diketonato metal complex in molar ratio. In that case, a sufficient amount of alkyl alcohol is contained to enhance stability of the complex structure of the β-diketonato metal complex, and thus the metal-containing additive highly effectively has high storage stability.

The β-diketonato metal complex preferably includes at least one metal selected from the group consisting of an alkaline earth metal, zinc, titanium, and aluminum. The β-diketonato complex with any one of such metals has high stability, and when containing an alkyl alcohol added thereto, has further high stability, in particular further high storage stability. Those metals have a valence of two or more and thus provide a stable crosslinked product when used for crosslinking of organic polymers.

At least part of the alkyl alcohol is preferably coordinated to metal atoms of the β-diketonato metal complex. Coordination of the alkyl alcohol to the metal atoms of the β-diketonato metal complex makes it possible to effectively stabilize a complex structure of the β-diketonato metal complex.

The metal-containing additive preferably has higher storage stability than the β-diketonato metal complex and preferably releases the metal ions at a temperature of 50° C. or higher and 200° C. or lower. In that case, the metal-containing additive can achieve both storage stability at room temperature and effective use of the metal ions by heating.

The crosslinkable polymer composition according to the disclosure includes the metal-containing additive and an organic polymer, and the organic polymer has a substituent capable of forming the ionic bonds with the metal ions released by heat from the metal-containing additive.

When the crosslinkable polymer composition is heated, the organic polymer is crosslinked via the metal ions released from the metal-containing additive. As a result, a cured product of the organic polymer can be formed so as to have high heat resistance after heating. On the other hand, since the metal-containing additive contained in the crosslinkable polymer composition of the disclosure has high storage stability, the crosslinkable polymer composition is highly fluid or soft when being not heated. Hence, the crosslinkable polymer composition can be disposed in a desired form at a desired position, for example, can be applied to a metal surface, easily and highly uniformly and then cured. As a result, a cured product having a dense structure can be produced.

The substituent of the organic polymer is preferably at least one selected from the group consisting of a carboxylic acid group, an acid anhydride group, a phosphoric acid group, and a sulfonic acid group. Since such functional groups easily form the ionic bonds with the metal ions released from the metal-containing additive, the crosslinkable polymer composition has an excellent crosslinking property.

The organic polymer is preferably liquid at 150° C. or lower. In that case, the crosslinkable polymer composition is easily disposed in a desired form at a desired position, for example, easily applied to a metal surface, at a relatively low temperature.

The metal-containing additive is preferably contained in an amount of 0.2 parts by mass or more and to 30 parts by mass or less with respect to 100 parts by mass of the organic polymer. In that case, a sufficient amount of the metal-containing additive is contained, which allows the crosslinkable polymer composition to have an excellent crosslinking property and makes it easy to avoid effects of a large amount of metal-containing additive contained, such as separation or precipitation of the metal-containing component.

The crosslinked polymer material of the disclosure is a crosslinked product of the crosslinkable polymer composition, and the organic polymer is crosslinked via the metal ions released from the metal-containing additive. The crosslinked polymer material is formed by releasing metal ions by heating from the metal-containing additive having high storage stability and crosslinking the organic polymer with the metal ions, and thus the crosslinkable polymer material can be easily disposed in a form of a cured product having high heat resistance in a desired form at a desired position.

A metal member according to the disclosure includes a metal base and a coating material that covers a surface of the metal base, and the coating material is composed of the crosslinked polymer material. The surface of the metal base is coated with the coating material composed of the crosslinked polymer material, so that the metal member has an excellent anticorrosion property and maintains its high anticorrosion property even if heated. Since the metal-containing additive having high storage stability is used as a raw material for the crosslinked polymer material, a metal member having such a coating material can be easily formed.

The wire harness of the disclosure includes the crosslinked polymer material. The wire harness includes the crosslinked polymer material and thus has an excellent anticorrosion property, and even if heated, maintains such high anticorrosion property. Since the metal-containing additive having high storage stability is used as a raw material for the crosslinked polymer material, such a wire harness having the excellent anticorrosion property can be easily formed.

Details of Embodiments of Present Disclosure

Specific examples of the metal-containing additive, the crosslinkable polymer composition, the crosslinked polymer material, the metal member, and the wire harness of the disclosure are now described with reference to the drawings. It is to be noted that the disclosure should not be limited to those examples.

[1] Metal-Containing Additive

The metal-containing additive according to the disclosure includes a β-diketonato metal complex and a primary alkyl alcohol having 4 to 30 carbon atoms (hereinafter sometimes simply referred to as alkyl alcohol). The β-diketonato metal complex containing the alkyl alcohol added thereto has higher storage stability than the β-diketonato metal complex itself. Herein, high storage stability means that quality change such as decomposition is less likely to occur at a low temperature such as room temperature, and thus the metal-containing additive can be stored for a longer time at that temperature while maintaining its chemical structure and physical properties.

The β-diketonato metal complex includes a β-diketonato ligand (1,3-diketonato ligand) coordinated to a central metal. The β-diketonato ligand is represented by general formula (1) below and bidentate coordinates to the central metal.

(1)

In formula (1), $R_1$, $R_2$, and $R_3$ each represent a hydrocarbon group. $R_1$, $R_2$, and $R_3$ may be hydrocarbon groups with the same structure or with different structures. $R_1$, $R_2$, and $R_3$ may each be an aliphatic hydrocarbon group or a hydrocarbon group containing an aromatic ring. $R_1$, $R_2$, and $R_3$ are each preferably a hydrocarbon group with 1 to 10 carbon atoms. $R_1$ may be hydrogen. As a possible case, at least two of the hydrocarbon groups $R_1$, $R_2$, and $R_3$ may be interconnected by a ring structure.

Examples of the β-diketonato ligands include: acetylacetonato ligands (acac); 2,2,6,6-tetramethyl-3,5-heptanedionato ligands (dpm); 3-methyl-2,4-pentadionato ligands; 3-ethyl-2,4-pentanedionato ligands; 3,5-heptanedionato ligands; 2,6-dimethyl-3,5-heptanedionato ligands; and 1,3-diphenyl-1,3-propanedionato ligands. Of these ligands, the acetylacetonato ligand is particularly preferred from the viewpoint of the magnitude of the stabilizing effect of addition of the alkyl alcohol. Only one ligand may be used, or two or more ligands may be used in combination.

Examples of metal species composing the β-diketonato metal complex include, but not limited to, alkaline earth metals, zinc, titanium, aluminum, iron, nickel, copper, and zirconium. Preferably, the metal species is at least one metal selected from the group consisting of an alkaline earth metal, zinc, titanium, and aluminum. The β-diketonato metal complex with such a metal as the central metal has high stability, and the addition of an alkyl alcohol further enhances the stability. Metal ions of the metal have a divalent or higher valence, and thus the crosslinkable polymer composition as described later has a high crosslinking property when the metal ions are released from the metal-containing additive for metal-crosslinking of the organic polymer. The metal species composing the β-diketonato metal complex may be one metal species or two or more metal species.

For example, formula (2) below shows a structure of the β-diketonato metal complex when the central metal ion is a divalent metal ion with planar tetracoordination. At this time, $R_1$ in formula (1) is assumed to be a hydrogen atom.

(2)

The alkyl alcohol used in the metal-containing additive is a primary alkyl alcohol having 4 to 30 carbon atoms and has a structure represented by formula (3) below.

R—OH (3)

R is an alkyl group having 4 to 30 carbon atoms.

For the metal additive of this embodiment, metal ions are released from the β-diketonato metal complex by heat, i.e., by heating the metal additive to a temperature higher than room temperature. However, as shown in later-described Example, the alkyl alcohol is added to the β-diketonato metal complex, thereby the metal additive has higher storage stability than the β-diketonato metal complex itself when being unheated, for example, at room temperature. Although β-diketonato metal complexes themselves have somewhat high storage stability and often do not easily undergo denaturation, such as decomposition, at a relatively low temperature such as room temperature, addition of the alkyl alcohol further enhances storage stability and can effectively suppress for a long period release of the metal ions by decomposition or the like at a relatively low temperature such as room temperature. On the other hand, when being heated, the β-diketonato metal complex releases metal ions by decomposition or the like, and thus can advance a reaction that requires presence of metal ions, such as metal-crosslinking in a crosslinkable polymer composition described later. The metal ions are also released by heating even when the alkyl alcohol is added. The temperature at which the metal ions are released is also substantially not changed by addition of the alkyl alcohol. Thus, by adding the alkyl alcohol to the β-diketonato metal complex, storage stability at a relatively low temperature such as room temperature is further enhanced while maintaining the property of releasing metal ions by heating, which makes it possible to achieve both suppression of deterioration under a low-temperature condition where release of the metal ions is not desired and efficient release of the metal ions under a condition where release of the metal ions is desired, such as during heating in use.

The enhancement of storage stability of the β-diketonato metal complex by addition of the alkyl alcohol can be explained by re-coordination of the alkyl alcohol to the β-diketonato metal complexes. The re-coordination refers to a phenomenon that the central metal of the β-diketonato metal complex is coordinated with the alkyl alcohol in addition to a β-diketonato ligand. The alkyl alcohol re-coordinates in a form of an alkoxy ligand. For example, a structure in which an alkyl alkoxy ligand is re-coordinated to the β-diketonato metal complex of formula (2) can be represented by formula (4) below.

(4)

In the formula, an alkyl chain of the alkyl alcohol is indicated by a wavy line.

The β-diketonato metal complex as shown in formula (2) can be said to be highly stable, as the central metal is protected by the β-diketonato ligand. However, due to size of the central metal, a structure of the ligand itself, steric hindrance caused by coordination geometry, etc., the complex structure may not take the most stable structure and may remain distorted. This distortion is a factor of destabilizing the structure of the β-diketonato metal complex. However, it is presumed that at least part of the alkyl alcohol is re-coordinated as shown in formula (4), and thus distortion of the complex structure is reduced by flexibility of the alkyl chain, resulting in enhancement of protection of the central metal. While enhancement of storage stability is not mentioned, it is also reported in NPTL1 and NPTL2 that not only the β-diketonato ligand, but also a ligand other than the β-diketonato ligand can be coordinated to the β-diketonato metal complex, and properties of the complex can be resultantly modified.

It is also suggested from studies based on infrared absorption spectra in the Example described later that alkyl alcohol re-coordination occurs when the alkyl alcohol is added to the β-diketonato metal complex. In addition to the re-coordination of the alkyl alcohol, other phenomena that can be assumed as possible origins of the enhancement of storage stability due to addition of the alkyl alcohol include substitution of some β-diketonato ligands by alkyl alkoxides and formation of double salts.

It may be possible to stabilize a structure of the β-diketonato metal complex by adding not only an alkyl alcohol but also a compound, which has a functional group capable of coordinating to a metal and an alkyl chain, to the β-diketonato metal complex. In the inventors' search, however, among the various compounds tested in the Example described later, including compounds having, as functional groups, an organic acid group such as a carboxyl group, an amino group, and an epoxy group, there has not been found a compound other than alkyl alcohols, which, when added to the β-diketonato metal complex, has the effect of enhancing storage stability while maintaining the property of releasing metal ions by heating at a temperature of 50° C. or higher and 200° C. or lower. In the case of adding the alkyl alcohol to the β-diketonato metal complex, stabilization of the complex structure is not too strong unlike the case of adding a compound, for example, a compound having a carboxyl group, forming a stronger bond with the central metal and re-coordinating thereto, and thus it is possible to easily release metal ions by decomposition of the complex structure or the like during heating while the effect of enhancing storage stability at room temperature or the like is exhibited.

The alkyl alcohol is a primary alcohol, and is thus more effective in stabilizing the β-diketonato metal complex than in the case where the alkyl alcohol is a secondary or tertiary alcohol, probably due to smaller steric hindrance. The number of carbons of the alkyl group (R), composing the alkyl alcohol, is 4 or more which provides a high effect on enhancing storage stability of the metal-containing additive. More preferably, the number of carbon atoms of the alkyl group is 5 or more. On the other hand, the number of carbon atoms of the alkyl group is 30 or less, which provides good compatibility with the β-diketonato metal complex. Still more preferably, the number of carbon atoms of the alkyl group is 24 or less. If the alkyl alcohol is a primary alcohol with a hydroxyl group attached to the end of the alkyl group, the alkyl group may be branched in the middle, but from the viewpoint of increasing the effect of enhancing storage stability, the alkyl group is preferably a linear alkyl group. The alkyl alcohol preferably has no functional group other than a hydroxyl group. Examples of preferred alkyl alcohols include 1-pentanol, 1-octanol, 1-dodecanol, and 1-hexadecanol. Only one type or two or more types of the alkyl alcohols may be used.

From the viewpoint of enhancing the effect of enhancing storage stability, the amount of the alkyl alcohol is preferably twice or more the amount of the β-diketonato metal complex in molar ratio. More preferably, the amount is 3 times or more, and further preferably 5 times or more. The upper limit of the amount of the alkyl alcohol to be added is not specified, but from the viewpoint of avoiding an excessive increase in the total amount of the metal-containing additive with respect to the required amount of the β-diketonato metal complex, the upper limit of the amount of the alkyl alcohol is preferably controlled to be 15 times or less the amount of the β-diketonato metal complex in molar ratio.

The metal-containing additive of this embodiment can be prepared by, for example, mixing a β-diketonato metal complex and an alkyl alcohol at a predetermined mixing ratio and stirring such a mixture. During the stirring, heating may be applied as necessary.

The metal-containing additive preferably releases metal ions by decomposition, phase transition (excluding melting), or the like at a temperature of 50° C. or higher and 200° C. or lower in the crosslinkable polymer composition described later. In that case, during storage at room temperature or during material preparation by mixing with other substances, etc., release of metal ions is suppressed, so that excellent storage and excellent handling properties are provided, and metal ions are easily released from the metal-containing additive by heating at an appropriate temperature, and phenomena that require metal ions, such as curing of the crosslinkable polymer composition described later, are easily progressed. Preferably, the metal-containing additive releases metal ions at a temperature of 150° C. or lower. The decomposition point or phase transition point of the metal-containing additive can be represented by baseline change start temperature obtained by Differential Scanning Calorimetry (DSC). The temperature at which the metal-containing additive releases metal ions by decomposition, phase transition, etc. can be adjusted by a specific type of the R-diketonato metal complex or the alkyl alcohol, and a blending ratio of such components.

The metal-containing additive of this embodiment described above is used as a component of the crosslinkable polymer composition described later, and the metal ions released by heating serve to metal-crosslink the organic polymer. The metal-containing additive is not limitedly applied to metal-crosslinking of organic polymers, but can be applied to various uses in which metal ions can be released by heating and used for chemical reactions or the like. Examples of such uses include surface treatment for antistatic purposes and modification of paints or adhesives.

The metal-containing additive described above contains only the R-diketonato metal complex and the alkyl alcohol as components. In the subsequent description of the crosslinkable polymer composition, the total amount of such two components is also used as the amount added to the metal-containing additive when referring to a blending ratio to another component, for example. However, some different component may be added to the metal-containing additive composed of the two components so that a metal-containing additive composition is formed and used. Examples of the different component can include a solvent, a pigment, a thickener, an antioxidant, and a corrosion inhibitor.

[2] Crosslinkable Polymer Composition and Crosslinked Polymer Material

The crosslinkable polymer composition of the disclosure includes, as component A, the metal-containing additive according to the embodiment of the disclosure as described above, and, as component B, an organic polymer having a substituent capable of forming ionic bonds with metal ions released from component A. The crosslinkable polymer composition of the disclosure is heated so that component B is crosslinked via the metal ions released from component A, and is thus cured and forms the crosslinked polymer material according to the embodiment of the disclosure.

In the organic polymer as component B, the substituent capable of forming the ionic bonds with the metal ions include a carboxylic acid group, an acid anhydride group, a phosphoric acid group, and a sulfonic acid group. The substituent includes no hydroxyl group. The substituent may include only one type of substituent or at least two types of substituents. The substituent is preferably at least one of the above-listed substituents. This is because such a substituent easily forms the ionic bonds with the metal ions released from component A. The substituent is preferably an electron-withdrawing group. This is because the electron-withdrawing group easily forms the ionic bonds with the metal ions released from component A.

While being not limited, the amount of the substituent in component B is preferably 0.01% by mass or more and 10% by mass or less from the viewpoint of ensuring physical properties by crosslinking. With the upper limit, the amount is more preferably 0.1% by mass or more, and further preferably 0.2% by mass or more. With the lower limit, the amount is more preferably 5% by mass or less, and further preferably 3% by mass or less. The amount of the substituent in component B can be determined by comparing peak height specific to the substituent in the infrared absorption spectrum with a spectral peak height of a material with a known amount.

The organic polymer of component B is an organic polymer including resin, rubber, and elastomer. Component B may be liquid or solid at room temperature, but is preferably liquid at 150° C. or lower. This is because, in that case, the crosslinkable polymer composition can be easily disposed in a desired form at a desired position, for example, easily applied to a metal surface at a relatively low temperature. Not only component B alone, but also the crosslinkable polymer composition as a whole is preferably liquid at a temperature below 150° C., and even at room temperature. This is because, in that case, it is easy to prepare the crosslinkable polymer composition. Furthermore, component B is preferably liquid at room temperature. Component B preferably has a molecular weight of 1000 or more. This is because such component B is easily cured by crosslinking even if it is liquid at room temperature. On the other hand, component B preferably has a molecular weight of 100,000 or less from the viewpoint that such component B tends to be liquid at room temperature. More preferably, component B has the molecular weight of 50,000 or less. The molecular weight of component B is represented by number average molecular weight (Mn) by Gel Permeation Chromatography (GPC) analysis.

Examples of the organic polymer of component B include polyolefin, polybutadiene, polyisoprene, polyacrylate, polymethacrylate, polyurethane, polyester, and organopolysiloxane (silicone). The substituent of component B may be a substituent introduced into either the main chain or the side chain of the organic polymer. The organic polymer of component B particularly preferably includes polybutadiene and polyisoprene from the viewpoint of securing fluidity at room temperature. Herein, "organic polymer" includes polymers with a relatively low degree of polymerization, such as oligomers.

The amount of component A in the crosslinkable polymer composition is preferably 0.2 parts by mass or more with respect to 100 parts by mass of component B. This provides a sufficient crosslinkable property with component B. More preferably, the amount of component A is 1 part by mass or more, further preferably 2 parts by mass or more, and still further preferably 3 parts by mass or more. On the other hand, the amount of component A is preferably controlled to be 30 parts by mass or less with respect to 100 parts by mass of component B. In that case, separation or precipitation of component A is easily avoided before crosslinking of the crosslinkable polymer composition, and aggregation of component A or deterioration of physical properties of the crosslinked product, such as embrittlement, is less likely to occur even after crosslinking. More preferably, the amount of component A is 20 parts by mass or less, and further preferably 15 parts by mass or less.

The crosslinkable polymer composition of the disclosure may appropriately contain additives such as a diluent, a dispersant, a colorant, and an anticorrosive component in addition to components A and B to the extent that material functions are not hindered. As explained in the above section on the metal-containing additive, in the inventors' search on the various compounds having functional groups that can coordinate to metals, such as organic acid groups including carboxyl groups, amino groups, and epoxy groups, there has not been found a compound other than alkyl alcohols, which, when added to the β-diketonato metal complex, has the effect of enhancing storage stability while maintaining the property of releasing metal ions by heating at a temperature of 50° C. or higher and 200° C. or lower. Even if the effect of enhancing storage stability is poor, a compound other than alkyl alcohols having functional groups which can coordinate to the β-diketonato metal complex, is not precluded from being added to the crosslinkable polymer composition as long as the compound does not significantly impair properties of the crosslinkable polymer composition, such as storage stability and a crosslinkable property. However, substances that inactivate the β-diketonato metal complex of component A, such as organic-acid containing compounds, substances that destabilize the β-diketonato metal complex, such as organic-amine containing compounds, substances that deactivate a functional group of component B, such as compounds having epoxy groups, are preferably not contained in the crosslinkable polymer composition.

In addition, the crosslinkable polymer composition preferably does not contain various curable materials, such as photocurable, moisture-curable, anaerobic-curable, cationic-curable, anionic-curable, and thermosetting materials. In the crosslinkable polymer composition of the disclosure, when component B is liquid at 150° C. or lower or at room temperature, component B preferably contains no polymeric component that is solid at 150° C. or lower or at room temperature. More preferably, the crosslinkable polymer composition contains only component B as a polymer component. Furthermore, compounds of groups (a) to (f) below can be listed as components that should not be contained in the crosslinkable polymer composition. Specifically, (a) silane coupling agents, (b) epoxy compounds, (c) isocyanates and isothiocyanate compounds, (d) photo-radical generators and thermal radical generators, and (e) chlorine compounds and bromine compounds can be listed. If any one of the compounds in the groups (a) to (d) is contained in the crosslinkable polymer composition, an unintended chemical reaction may occur during heating, for example, crosslinking of component B through a reaction different from the crosslinking reaction mediated by the metal ions released from component A, or cleavage of the main chain of component B. In that case, properties of the crosslinkable polymer material, such as heat resistance, may not be exhibited sufficiently. If any one of the compounds in the group (e) is contained in the crosslinkable polymer composition, coloring or generation of corrosive gas may occur.

The crosslinkable polymer composition can be easily prepared by adding a beforehand prepared component A to component B and mixing together, and then dispersing component A in component B. In preparing the crosslinkable polymer composition, mixing is preferably performed at room temperature, but may be performed under heating as necessary.

In the crosslinkable polymer composition of the disclosure having the above configuration, the metal ions are released from component A by heat, the released metal ions ionically bond with the substituent of component B, and thus the organic polymer of component B is crosslinked via ionic bond. Since the rate of ionic bond formation is faster than the rate of covalent bond formation, the crosslinkable polymer composition of the disclosure has high curing rate. In addition, component A releases the metal ions by heat, and thus, below the temperature at which the metal ions are released, no metal ions are released from component A, and crosslinking of the organic polymer of component B through ionic bonding does not proceed. Hence, the crosslinkable polymer composition of the disclosure further has excellent storage stability, and allows a cured product to be easily formed in a desired form, such as a coating film, with a highly uniform structure, by disposing the crosslinkable polymer composition in a desired form at a desired position, for example, by applying it to a metal surface, in a highly fluid state or a soft state before crosslinking, and then heating. Furthermore, for the crosslinkable polymer composition of the disclosure, the organic polymer of component B is crosslinked via ionic bond, so that binding force is stronger than van der Waals force, and thus a strong crosslinked product is formed. In addition, the crosslinkable polymer composition of the disclosure has excellent heat resistance and excellent chemical resistance because the organic polymer of component B is crosslinked via ionic bond.

The crosslinkable polymer composition of this embodiment can be used in a manner similar to thermosetting resins in that curing can be progressed by heating. In comparison with other types of curable resins having curing properties, therefore, the crosslinkable polymer composition can be provided with advantages of thermosetting resins in the same way as with the thermosetting resins. Examples of such advantages can include the following. That is, operations such as light irradiation for light-curing resins, supply of moisture for moisture-curing resins, and blocking of oxygen for anaerobic-curing resins are not required for curing. In addition, there is no concern about corrosion of a coating surface unlike the case of cation-curable or anion-curable resins. In addition, although general thermosetting resins are less likely to achieve both fast curing and storage stability, the crosslinkable polymer composition of this embodiment can achieve both fast curing and storage stability. In typical thermosetting resins such as epoxy resins, curability can be enhanced by lowering curing start temperature, which however makes it difficult to sufficiently suppress curing progress even at a relatively low temperature such as room temperature, resulting in low storage stability. On the other hand, for the crosslinkable polymer composition of this embodiment, as described above, component A is held stable in a state where the metal ions are not released at a relatively low temperature, such as room temperature, but once the metal ions are released by heating, metal-crosslinking of component B can be progressed. While curing by heating takes a long time for typical thermosetting resins, the crosslinkable polymer composition of this embodiment can be cured in a relatively short time if heated to a temperature at which the metal ions are released from component A.

Although the metal-containing additive containing the β-diketonato metal complex and the alkyl alcohol is used as component A in this embodiment, even if the β-diketonato metal complex is used alone as component A, component B can be cross-linked via release of the metal ions by heating, and thus excellent rapid curability can be exhibited. Even in that case, a certain degree of high storage stability is achieved. However, addition of the alkyl alcohol to the β-diketonato metal complex results in higher storage stability of the metal-containing additive than in the case of using the β-diketonato metal complex itself, as described above for the metal-containing additive. Even in the state of the crosslinkable polymer composition in which the metal-containing additive is mixed with the organic polymer of component B, the effect of enhancing storage stability by adding the alkyl alcohol to the metal-containing additive is maintained, and the composition as a whole exhibits higher storage stability than in the case of using the β-diketonato metal complex itself. For example, the composition is less likely to deteriorate even after being stored at a relatively high temperature or over a long period of time. On the other hand, the property of the β-diketonato metal complex, i.e., excellent rapid curability through metal-crosslinking of component B by releasing the metal ions by heating, is maintained even after addition of the alkyl alcohol to the metal-containing additive.

As described above, the crosslinkable polymer composition of the disclosure is easily crosslinked and cured by heat. The crosslinked polymer material of the disclosure is composed of the crosslinked product of the crosslinkable polymer composition of the disclosure. In the crosslinked product, component B in the crosslinkable polymer composition is crosslinked via the metal ions released from component A.

The crosslinkable polymer composition of the disclosure can be preferably used as protective, adhesive, curing molding materials, and the like. The crosslinkable polymer composition can also be used for anticorrosion. For example, the crosslinkable polymer composition can be used for anticorrosion, i.e., can be adhered to a surface of a metal base being a surface protection object to cover the metal base for preventing metal corrosion. Furthermore, for anticorrosion use, the crosslinkable polymer composition can be used as an anticorrosion agent for a covered wire with a terminal, for example.

[3] Metal Member

Figure 1:
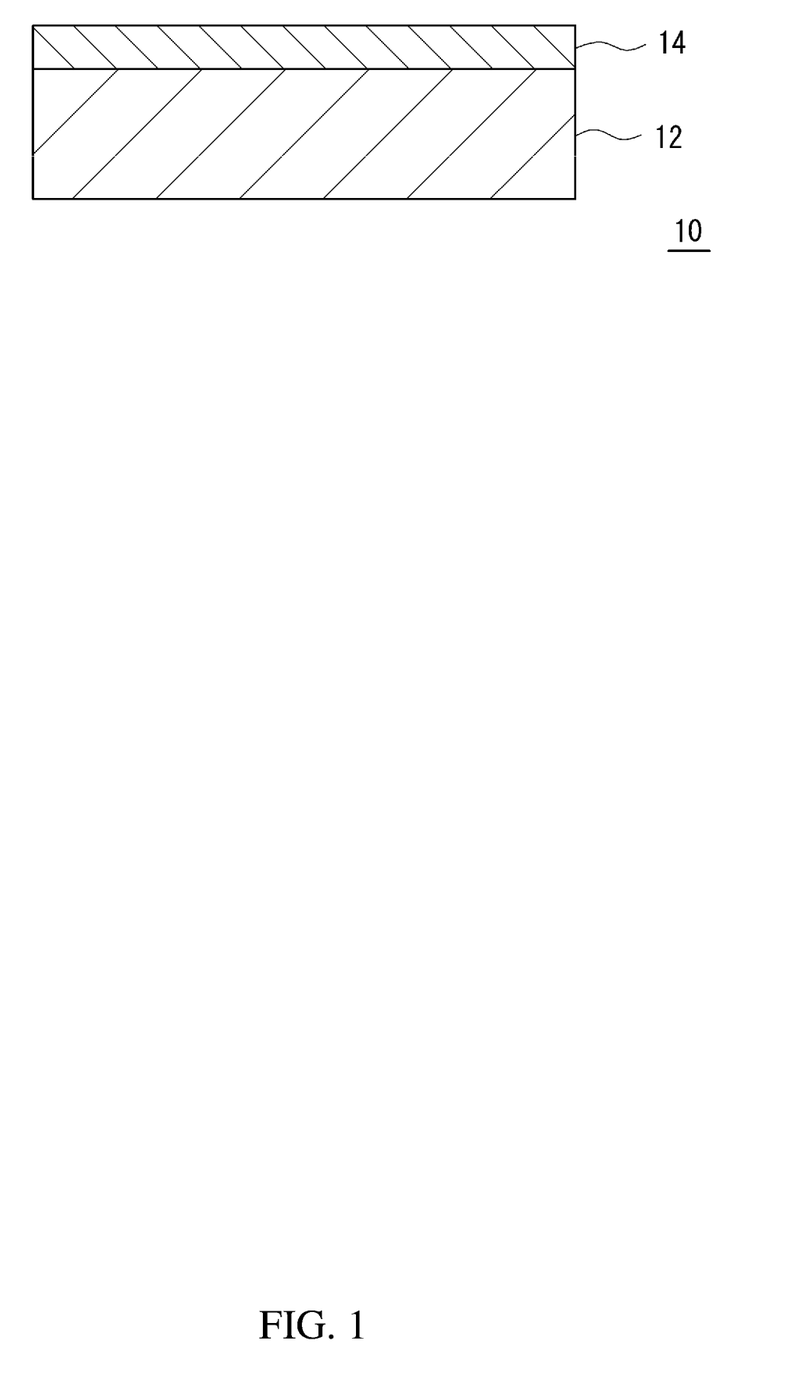
FIG. 1 is a cross section of a metal member according to one embodiment of the disclosure.

The metal member according to the disclosure is now described. FIG. 1 shows a cross section of a metal member according to one embodiment.

A metal member 10 includes a metal base 12 and a coating material 14 covering a surface of the metal base 12, and the coating material 14 is composed of the crosslinked polymer material of the disclosure, i.e., the crosslinked product (cured product) of the crosslinkable polymer composition of the disclosure. The fast curing and storage stability effects of the crosslinkable polymer composition make it easier to form a layer of the coating material 14 as a dense film, so that a high anticorrosion property is exhibited by the coating material 14 to the metal base 12.

[4] Wire Harness

The wire harness according to the disclosure is now described. The wire harness of the disclosure includes the crosslinked polymer material of the disclosure. Specifically, for example, there is a mode, in which the crosslinked polymer material of the disclosure is used in an anticorrosive agent covering an electrical connection between a terminal fitting of a covered wire with a terminal and a wire conductor in the wire harness.

A covered wire with a terminal, which configures the wire harness of the disclosure, is described below. The covered wire with a terminal is configured such that a terminal fitting is connected to a conductor terminal of an insulated wire, in which the electrical connection between the terminal fitting and the wire conductor is covered with the crosslinked polymer material (a cured product of the crosslinkable polymer composition of the disclosure) of the disclosure. This structure prevents corrosion at the electrical connection.

Figure 2:
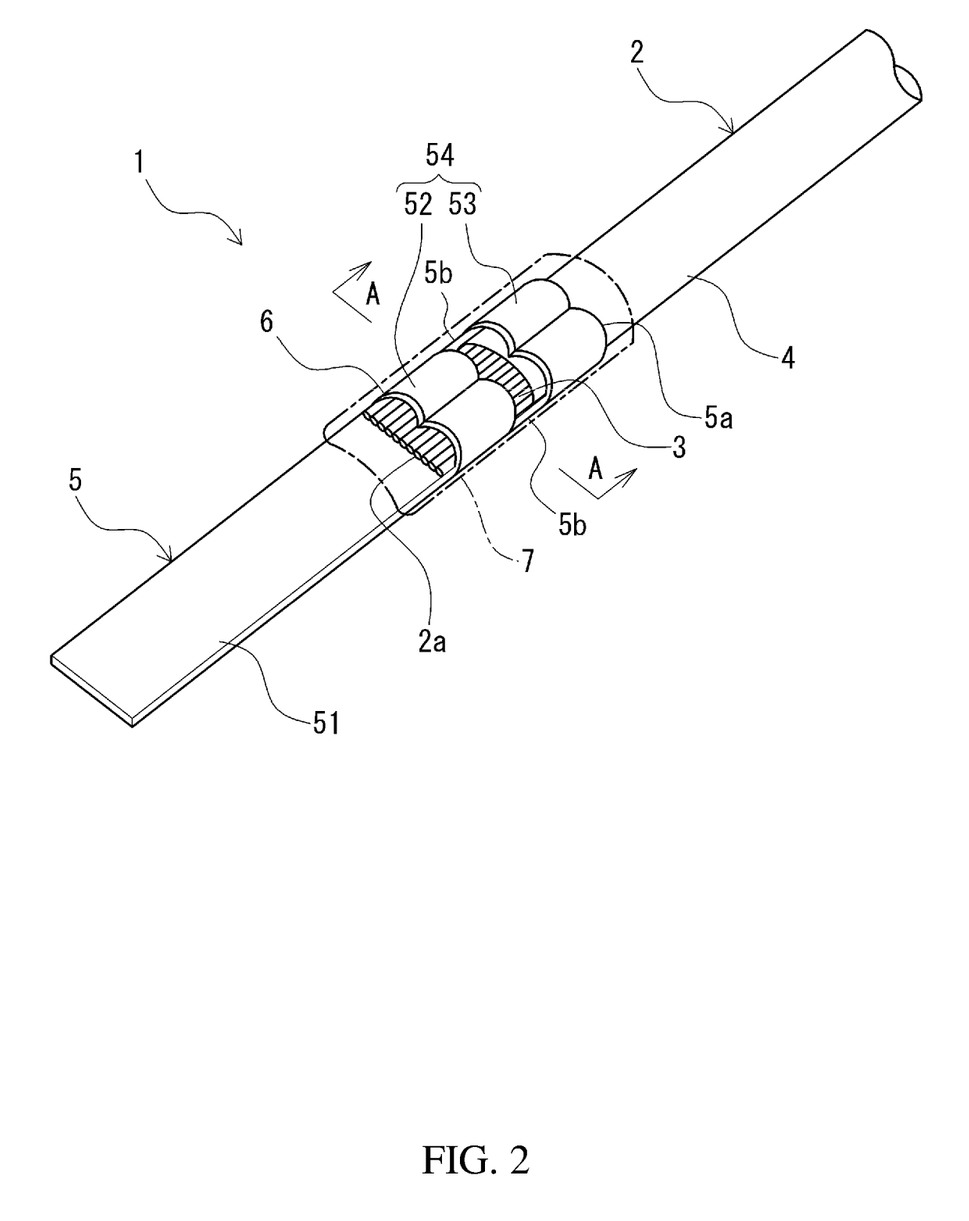
FIG. 2 is a perspective view of a wire harness according to one embodiment of the disclosure.
Figure 3:
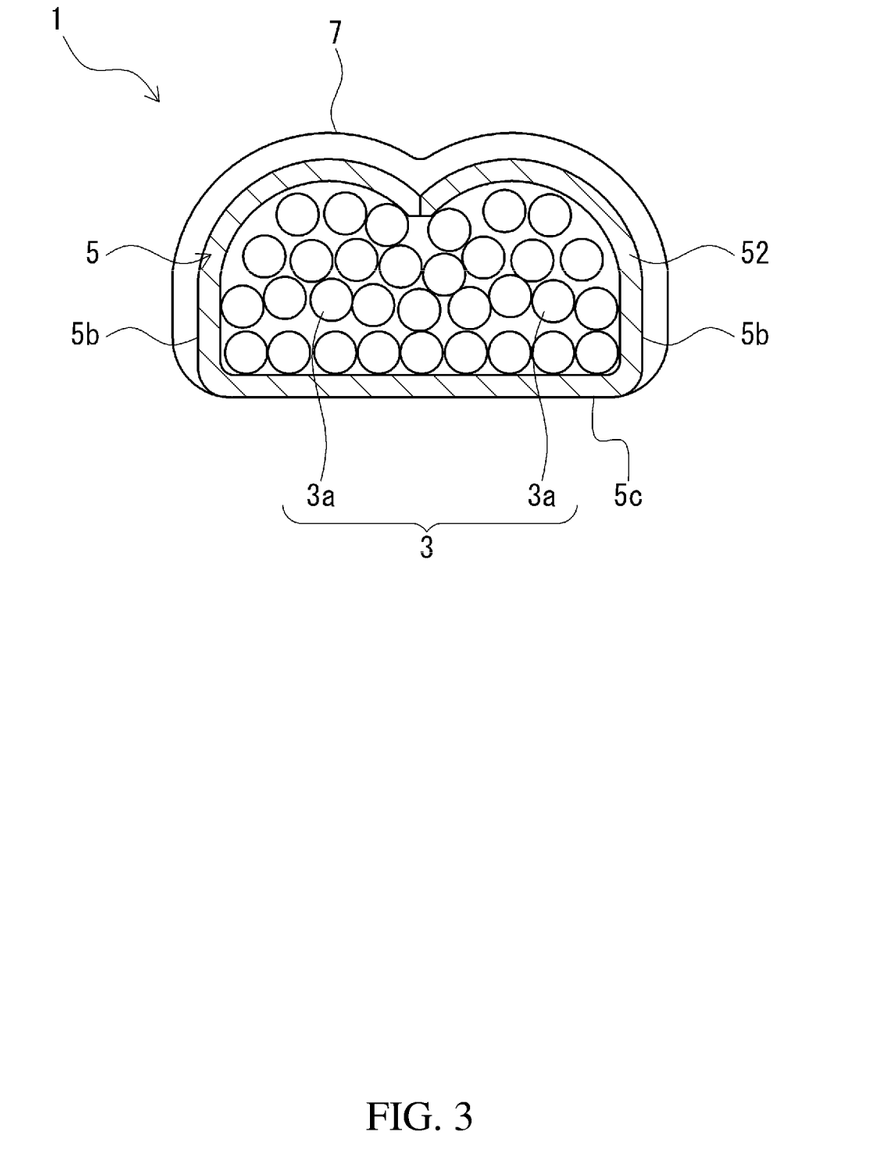
FIG. 3 is a vertical cross section along the line A-A in FIG. 2.

FIG. 2 is a perspective view of the covered wire with a terminal according to one embodiment of the disclosure. FIG. 3 is a vertical cross section along a line A-A in FIG. 2. As illustrated in FIGS. 2 and 3, a covered wire 1 with a terminal is configured such that a wire conductor 3 of a covered wire 2, in which the wire conductor 3 is covered with an insulation coating (insulator) 4, and a terminal fitting 5 are electrically connected together by an electrical connection 6.

The terminal fitting 5 includes a tab-shaped connection portion 51 formed of an elongated flat plate to be connected to a mating terminal, and a wire fixture 54 formed of a wire barrel 52 and an insulation barrel 53 formed in an extending manner on an end portion of the connection portion 51. The terminal fitting 5 can be formed (machined) into a predetermined shape by pressing a metal plate.

At the electrical connection 6, the insulation coating 4 of a terminal of the covered wire 2 is peeled off to expose the wire conductor 3, and the exposed wire conductor 3 is crimped onto one side of the terminal fitting 5 to connect the covered wire 2 to the terminal fitting 5. The wire barrel 52 of the terminal fitting 5 is swaged over the wire conductor 3 of the covered wire 2 to electrically connect the wire conductor 3 and the terminal fitting 5. Furthermore, the insulation barrel 53 of the terminal fitting 5 is swaged over the insulation coating 4 of the covered wire 2.

In the covered wire 1 with the terminal, the area indicated by the single dotted line is covered with a cured product 7 of the crosslinkable polymer composition of the disclosure. Specifically, the cured product 7 covers the area from the surface of the terminal fitting 5 ahead of the tip end of a portion of the wire conductor 3 exposed from the insulation coating 4 to the surface of the insulation coating 4 behind the rear end of the portion of the wire conductor 3 exposed from the insulation coating 4. That is, the tip end 2a side of the covered wire 2 is covered with the cured product 7 so as to slightly protrude from the tip end of the wire conductor 3 toward the connection portion 51 of the terminal fitting 5. The edge 5a side of the terminal fitting 5 is covered with the cured product 7 so as to protrude slightly from the end of an insulation barrel 53 toward the insulation coating 4 of the covered wire 2. As shown in FIG. 3, the side 5b of the terminal fitting 5 is also covered with the cured product 7. The back 5c of the terminal fitting 5 may or may not be covered with the cured product 7. The peripheral edge of the cured product 7 is configured of a portion in contact with the surface of the terminal fitting 5, a portion in contact with the surface of the wire conductor 3, and a portion in contact with the surface of the insulation coating 4.

In this way, the electrical connection 6 is covered with the cured product 7 with a predetermined thickness along the shape of the outer peripheries of the terminal fitting 5 and the covered wire 2. The exposed portion of the wire conductor 3 of the covered wire 2 is thus completely covered with the cured product 7 so as not to be exposed to the outside. The electrical connection 6 is therefore completely covered with the cured product 7. The cured product 7 has excellent adhesion to the wire conductor 3, the insulation coating 4, and the terminal fitting 5, and thus prevents metal portions from corroding due to moisture or the like entering the wire conductor 3 and electrical connection 6 from the outside. Since the cured product 7 has excellent adhesion, even if the electric wire is bent, for example, in a process from manufacturing of a wire harness to attaching of the wire harness to a vehicle, a gap is less likely to be formed between the cured product 7 and any of the following: the wire conductor 3; the insulation coating 4; and the terminal fitting 5, at the circumferential end of the cured product 7, so that waterproof and anticorrosion functions are maintained.

The crosslinkable polymer composition of the disclosure forming the cured product 7 is disposed in a predetermined area. The crosslinkable polymer composition of the disclosure forming the cured product 7 can be disposed using any of known methods such as a dropping method and a coating method.

The cured product 7 is formed in a predetermined thickness over the predetermined area. The thickness is preferably 0.1 mm or less. Extremely large thickness of the cured product 7 makes it difficult to insert the terminal fitting 5 into a connector.

The wire conductor 3 of the covered wire 2 is configured of a twisted wire formed by twisting a plurality of strands 3a. In this case, the twisted wire may be configured of one type of metal strand or two or more types of metal strands. The twisted wire may include, for example, a strand made of an organic fiber in addition to the metal strand. It is to be noted that "configured of one type of metal strand" means that all the metal strands configuring the twisted wire are made of the same metal material, and "configured of two or more types of metal strands" means that the twisted wire includes metal strands made of different metal materials. The twisted wire may include a reinforcing wire (tension member) or the like for reinforcing the covered wire 2.

Examples of material of the metal strand configuring the wire conductor 3 can include copper, copper alloy, aluminum, aluminum alloy, and materials with various types of plating on such materials. Examples of material of the metal strand as the reinforcing wire can include copper alloy, titanium, tungsten, and stainless steel. Examples of the organic fiber as the reinforcing wire can include Kevlar. Aluminum, aluminum alloys, and materials with various types of plating thereon are preferred for the metal strand configuring the wire conductor 3 from the viewpoint of weight reduction.

Examples of materials for the insulation coating 4 include rubber, polyolefin, PVC, and thermoplastic elastomers. These materials may be used alone or in combination of two or more. Various additives may be appropriately added to the material of the insulation coating 4. Examples of the additives can include flame retardants, fillers, and colorants.

Examples of the material of the terminal fitting 5 (material of a base material) can include generally used brass, various copper alloys, and copper. A part (for example, a contact) of or the whole of the surface of the terminal fitting 5 may be plated with any of various metals such as tin, nickel, and gold.

Although the terminal fitting is connected by crimping to the terminal of the wire conductor in the covered wire 1 with the terminal shown in FIG. 2, other known electrical connection methods such as welding may be used instead of the crimp connection.

Example

Example is now described. The present invention is not limited by the Example. Herein, relationships between a component composition of the metal-containing additive and storage stability as well as curing rate of the crosslinkable polymer composition were examined. In addition, a state of the metal-containing additive was investigated.

[1] Effect of Addition of Metal-Containing Additive

First, effects of addition of the metal-containing additive and a component composition thereof on the composition were examined.

Preparation of Metal-Containing Additive

Additives 1 to 10 were prepared by blending β-diketonato metal complexes and alkyl alcohols in the blending compositions listed in Table 1, mixing those uniformly at 80° C. for 10 min, and then allowing the mixture to cool to room temperature. In addition, additives 11 to 14 were prepared in the same method, using components other than alcohols instead of the alkyl alcohols.

Materials used for preparation of the metal-containing additives are as follows.

(1) β-diketonato Metal Complexes
  Zn-AA: Zinc (II) acetylacetonate (decomposition starting point: 105° C.).
  Ca-AA: Calcium (II) acetylacetonate (phase transition starting point: 110° C.).
  Al-AA: Aluminum (III) acetylacetonate (phase transition starting point: 112° C.).
  The decomposition starting point or phase transition starting point of each metal complex was evaluated as the baseline change starting temperature in DSC (measurement temperature range: 25 to 200° C., measurement in air).

(2) Alkyl Alcohols
  1-Pentanol.
  1-Octanol.
  1-Dodecanol.
  1-Hexadecanol.
  2-Propanol.
  3-Octanol.
  (Each manufactured by Fujifilm Wako Pure Chemical Industries, Ltd.).

(3) Components other than alcohols
  Glycolic acid.
  Lauric acid.
  Dodecylamine.
  1,2-Epoxydodecane.
  (Each manufactured by Tokyo Chemical Industry Co., Ltd.).

Preparation of Crosslinkable Polymer Composition

The above-prepared metal-containing additives as component A were mixed with the organic polymers as component B in blending compositions (unit:parts by mass) listed in Tables 2 and 3, for 5 min in an agate mortar at room temperature. Thus, compositions of samples A1 to A11, B1 to B4, and B7 to B11 were prepared. In samples B2 to B4, the β-diketonato metal complex itself, which was used above as a raw material for preparation of the metal-containing additive, was used as component A. In the respective samples, the blending amounts of component A were set such that the amounts (molar amounts) of the β-diketonato metal complexes were similar to each other. Further, sample B5 was composed of component B only, and sample B6 was composed of epoxy resin only.

The organic polymeric materials used are as follows.

(1) Component B
  MA5: Maleic anhydride modified liquid polybutadiene (manufactured by CRAY VALLEY), average molecular weight 4700, substituent equivalent 2350 g/mol.
  UC3510: Carboxyl group-introduced liquid polyacrylate (manufactured by Toagosei Co., Ltd.), number average molecular weight 2000, substituent equivalent 801 g/mol.
  X-22-3701E: Carboxyl-modified silicone oil (manufactured by Shin-Etsu Chemical Co., Ltd.), substituent equivalent 4000 g/mol.

(2) Other Organic Polymers
  Epoxy resin: Epoxy resin "jER828" (epoxy equivalent: 184 or more and 194 or less) manufactured by Mitsubishi Chemical, to which "ST12" (amine equivalent: 345 KOHmg/g or more and 385 KOHmg/g or less) manufactured by Mitsubishi Chemical was added as a curing agent. The blending ratio was epoxy resin/curing agent=67/33 (unit:parts by mass).

Evaluation Method (1) Storage Stability

The storage stability was evaluated by whether curing of the composition has progressed after leaving the prepared composition for 72 hours in a thermostatic bath at 40° C. (in accordance with JIS 60068-2-2) as an accelerated condition for evaluating long-term storage stability. The composition was evaluated as having excellent long-term storage stability (E) when viscosity of the composition was comparable to that in the initial state after being subjected to the above-mentioned accelerated condition. On the other hand, if the viscosity of the composition increased after being subjected to the accelerated condition, the composition was evaluated as having poor long-term storage stability (N). At this time, the viscosity of the composition was evaluated by a cone plate rotational viscometer (Merlin VR from Rheosys).

(2) Curing Time

A copper plate 50 mm long, 50 mm wide, and 0.5 mm thick was preheated to 120° C., and 0.1 g of each prepared composition was dripped on the plate. The time point at which each composition was dripped onto the heated copper plate was defined as 0 sec, and the time until the dripped composition was cured was defined as curing time. Time taken for the composition to cure was defined as the time until the composition ceased to string when a spatula was applied to the surface of the dripped composition and pulled up. A composition found to cure within 60 sec can be evaluated to be excellent in curing rate (cure fast).

Evaluation Results

Table 1 below shows in units of mass (g) the blending composition of each of the prepared metal-containing additives (component A). The blending ratio of the alkyl alcohol or another component to the β-diketonato metal complex is indicated by the molar blending ratio based on the amount of the β-diketonato metal complex. The blending ratio of each additive is 4.4 or 4.5, except for additives 7 and 8.

TABLE 1

|  |  | Molecular weight | Additive type | | | | | | | | | | | | | |
|---|---|---|---|---|---|---|---|---|---|---|---|---|---|---|---|---|
|  |  |  | 1 | 2 | 3 | 4 | 5 | 6 | 7 | 8 | 9 | 10 | 11 | 12 | 13 | 14 |
| β-diketonato metal complex | Zn-AA | 263.6 | 1.0 | 1.0 | 1.0 | 1.0 | — | — | 1.0 | 1.0 | 1.0 | 1.0 | 1.0 | 1.0 | 1.0 | 1.0 |
|  | Ca-AA | 238.3 | — | — | — | — | 1.0 | — | — | — | — | — | — | — | — | — |
|  | Al-AA | 324.3 | — | — | — | — | — | 1.0 | — | — | — | — | — | — | — | — |
| Alkyl alcohol | 1-Pentanol | 88.2 | 1.5 | — | — | — | — | — | — | — | — | — | — | — | — | — |
|  | 1-Octanol | 130.2 | — | 2.2 | — | — | — | — | 1.0 | 5.0 | — | — | — | — | — | — |
|  | 1-Dodecanol | 186.3 | — | — | 3.1 | — | 3.5 | 2.6 | — | — | — | — | — | — | — | — |
|  | 1-Hexadecanol | 242.5 | — | — | — | 4.1 | — | — | — | — | — | — | — | — | — | — |
|  | 2-Propanol | 60.1 | — | — | — | — | — | — | — | — | 1.0 | — | — | — | — | — |
|  | 3-Octanol | 130.2 | — | — | — | — | — | — | — | — | — | 2.2 | — | — | — | — |
| Other than alcohol | Glycolic acid | 76.1 | — | — | — | — | — | — | — | — | — | — | 1.3 | — | — | — |
|  | Lauric acid | 200.3 | — | — | — | — | — | — | — | — | — | — | — | 3.4 | — | — |
|  | Dodecylamine | 185.4 | — | — | — | — | — | — | — | — | — | — | — | — | 3.1 | — |
|  | 1,2-Epoxydodecane | 184.3 | — | — | — | — | — | — | — | — | — | — | — | — | — | 3.1 |
| Molar blending ratio (alcohol etc./β-diketonato complex) | | | 4.5 | 4.5 | 4.4 | 4.5 | 4.5 | 4.5 | 2.0 | 10.1 | 4.4 | 4.5 | 4.5 | 4.5 | 4.4 | 4.4 |

Furthermore, in Tables 2 and 3, the amount (unit:parts by mass) of each component for the compositions of samples A1 to A11 and B1 to B11 prepared as above are shown in the upper row, and results of each evaluation are shown in the lower row.

TABLE 2

|  |  | Sample number | | | | | | | | | | |
|---|---|---|---|---|---|---|---|---|---|---|---|---|
|  |  | A1 | A2 | A3 | A4 | A5 | A6 | A7 | A8 | A9 | A10 | A11 |
| Component A | Additive 1 | 5.0 | — | — | — | — | — | — | — | — | — | — |
|  | Additive 2 | — | 6.4 | — | — | — | — | — | — | 6.4 | 6.4 | 0.2 |
|  | Additive 3 | — | — | 8.2 | — | — | — | — | — | — | — | — |
|  | Additive 4 | — | — | — | 10.2 | — | — | — | — | — | — | — |
|  | Additive 5 | — | — | — | — | 9.0 | — | — | — | — | — | — |
|  | Additive 6 | — | — | — | — | — | 7.2 | — | — | — | — | — |
|  | Additive 7 | — | — | — | — | — | — | 4.0 | — | — | — | — |
|  | Additive 8 | — | — | — | — | — | — | — | 12.0 | — | — | — |
| Component B | MA5 | 100 | 100 | 100 | 100 | 100 | 100 | 100 | 100 | — | — | 100 |
|  | UC3510 | — | — | — | — | — | — | — | — | 100 | — | — |
|  | X-22-3701E | — | — | — | — | — | — | — | — | — | 100 | — |
| Other organic polymers | Epoxy resin | — | — | — | — | — | — | — | — | — | — | — |
| Evaluation results | Storage stability | E | E | E | E | E | E | E | E | E | E | E |
|  | Curing time (s) | 35 | 35 | 40 | 40 | 50 | 50 | 40 | 55 | 40 | 40 | 55 |

TABLE 3

|  |  | Sample number | | | | | | | | | | |
|---|---|---|---|---|---|---|---|---|---|---|---|---|
|  |  | B1 | B2 | B3 | B4 | B5 | B6 | B7 | B8 | B9 | B10 | B11 |
| Component A | Additive 9 | 4.0 | — | — | — | — | — | — | — | — | — | — |
|  | Additive 10 | — | — | — | — | — | — | 6.4 | — | — | — | — |
|  | Additive 11 | — | — | — | — | — | — | — | 4.6 | — | — | — |
|  | Additive 12 | — | — | — | — | — | — | — | — | 8.8 | — | — |

TABLE 3-continued

| | | Sample number | | | | | | | | | | |
|---|---|---|---|---|---|---|---|---|---|---|---|---|
| | | B1 | B2 | B3 | B4 | B5 | B6 | B7 | B8 | B9 | B10 | B11 |
| | Additive 13 | — | — | — | — | — | — | — | — | — | 8.2 | — |
| | Additive 14 | — | — | — | — | — | — | — | — | — | — | 8.2 |
| | Zn-AA | — | 2.0 | — | — | — | — | — | — | — | — | — |
| | Ca-AA | — | — | 2.0 | — | — | — | — | — | — | — | — |
| | Al-AA | — | — | — | 2.0 | — | — | — | — | — | — | — |
| Component B | MA5 | 100 | 100 | 100 | 100 | 100 | — | 100 | 100 | 100 | 100 | 100 |
| | UC3510 | — | — | — | — | — | — | — | — | — | — | — |
| | X-22-3701E | — | — | — | — | — | — | — | — | — | — | — |
| Other organic polymers | Epoxy resin | — | — | — | — | — | 100 | — | — | — | — | — |
| Evaluation results | Storage stability | N | N | N | N | E | N | N | E | E | N | N |
| | Curing time (s) | 30 | 45 | 45 | 50 | >600 | 420 | 35 | 400 | 550 | 10 | 480 |

The compositions of the samples A1 to A11 each contain, as component A, a metal-containing compound prepared from a β-diketonato metal complex and a primary alkyl alcohol having 4 to 30 carbon atoms, and component B including an organic polymer with a substituent capable of forming ionic bonds with metal ions. Corresponding to this composition, in all of the samples A1 to A11, the composition has high long-term storage stability evaluated as "E" and curing proceeds in a short curing time of 60 seconds or less. It is interpreted that component A has high stability without denaturation in an accelerated test at 40° C., and when heated to 120° C., releases metal ions to cause metal-crosslinking of component B. In the samples A2, A7 and A8, although molar blending ratios of the metal-containing additives are different from each other, the additive amounts of those metal-containing additives are set such that the compositions contain similar amounts of the β-diketonato metal complex, thereby high storage stability and sufficiently short curing time are achieved in any sample. Although the samples A1 to A6 and A9 to A11 differ in the composition of the metal-containing additive of component A or in the type of the organic polymer of component B, each sample achieves high storage stability and fast curing rate.

The sample B5 contains only component B and no metal-containing additive of component A, and thus cannot cause metal cross-linking and has not cured beyond 600 sec while having excellent storage stability. The sample B6, which uses only commercially available two-component epoxy resin that cures at room temperature, is significantly inferior in storage stability, as it cures while being held at 40° C. in the storage stability evaluation. On the other hand, the sample B6 is low in curing rate at 120° C., i.e., requires a long time of 420 seconds to cure.

In the samples B2 to B4, a β-diketonato metal complex, which is not subjected to stabilization by addition of an alkyl alcohol, is used as component A, and thus storage stability of the composite is low, i.e., evaluated as "N". In this Example, assuming long-term storage, the storage stability is evaluated by an accelerated test at 40° C. For the samples B2 to B4, however, when like storage stability evaluation is carried out at room temperature, a composition, in which the β-diketonato metal complex itself is mixed with component B, also achieves sufficiently high storage stability. In this curing rate test, curing time observed for the samples B2 to B4 and that for the samples A1 to A11, in which alkyl alcohol is added to the β-diketonato metal complex, are similar to each other, showing that even if the alkyl alcohol is added, metal ions are released during heating at a rate similar to that for the β-diketonato metal complex itself.

In the sample B1, a material including a β-diketonato metal complex, to which an alkyl alcohol is added, is used as component A. However, the alkyl alcohol used is 2-propanol, where the number of carbon atoms is as small as 3. Corresponding to the extremely short alkyl chain of the alkyl alcohol, the effect of stabilizing the structure of the β-diketonato metal complex is small, resulting in low storage stability of the composition.

Likewise, in the sample B7, a material including a β-diketonato metal complex, to which an alkyl alcohol is added, is used as component A. However, the alkyl alcohol is a secondary alcohol rather than a primary alcohol. Probably, the effect of structural stabilization on the β-diketonato metal complex is reduced corresponding to the large steric hindrance of the alkyl alcohol, resulting in a reduction in storage stability of the composition.

In the samples B8 and B9, a material including a β-diketonato metal complex, to which carboxylic acid is added instead of the alkyl alcohol, is used as component A. In these samples, long time is taken for curing while the compositions exhibit high storage stability. Probably, the carboxylic acid excessively strongly re-coordinates to the central metal of the β-diketonato metal complex due to its excessively high electron-withdrawing property, so that metal ions are not released even by heating, although high effect is shown in stabilization of the complex structure. A glycolic acid used in the sample B8 has a hydroxyl group in addition to a carboxyl group, and re-coordinates at the site of the carboxyl group having a stronger electron-withdrawing property, which probably prevents moderate structural stabilization and capability to release metal ions by heating from being achieved together unlike the case of using the alkyl alcohol.

In the sample B10, a material including a β-diketonato metal complex, to which an alkylamine is added instead of the alkyl alcohol, is used as component A. The composition of the sample B10 cures in an extremely short time, but has poor storage stability. Although the alkylamine can also re-coordinate to the central metal of the β-diketonato metal complex, the re-coordination is considered to rather destabilize the complex structure. It is interpreted that the destabilization of the complex structure enhances reaction activity, and thus metal ions are easily released, resulting in a shorter curing time.

In the sample B11, a material including a β-diketonato metal complex, to which an epoxy compound is added instead of the alkyl alcohol, is used as component A. The composition of the sample B11 has low storage stability and takes a long time to cure. It is interpreted that an epoxy group cannot coordinate to a metal and do not stabilize the β-diketonato metal complex by re-coordination, and correspondingly does not act as a component that enhances the storage stability of the composition. It is presumed that the long curing time is due to the fact that heating causes a side reaction between a functional group of component B and the epoxy group, and thus metal-crosslinking is less likely to occur. It can be said that the epoxy compound is not suitable as an additive component not only in that it does not contribute to enhancing storage stability but also in that it itself has reaction activity with component B.

[2] Structure of Metal-Containing Additive

Subsequently, a structure of a metal-containing additive including a β-diketonato metal complex, to which an alkyl alcohol is added, was investigated.

Preparation of Metal-Containing Additive

The metal-containing additive was prepared in the same way as in the above test [1] using three types of complexes, Zn-AA, Ca-AA, and Al-AA, as the β-diketonato metal complexes and 1-dodecanol as the alkyl alcohol. At this time, however, the blending ratios below were used such that the additive amount of the 1-dodecanol was less than twice that of the β-diketonato metal complex in terms of molar blending ratio so as not to produce excess alcohol.

1.0 g (5.4 mmol) of 1-dodecanol was added to 1.0 g (3.8 mmol) of Zn-AA.
1.0 g (5.4 mmol) of 1-dodecanol was added to 1.0 g (4.2 mmol) of Ca-AA.
1.0 g (5.4 mmol) of 1-dodecanol was added to 1.0 g (3.1 mmol) of Al-AA.

Evaluation Method

The β-diketonato metal complexes and 1-dodecanol as raw materials, and the metal-containing additives prepared as above were subjected to infrared absorption measurement (FT-IR measurement) by the attenuated total reflection measurement method (ATR method).

Evaluation Results

Figure 4:
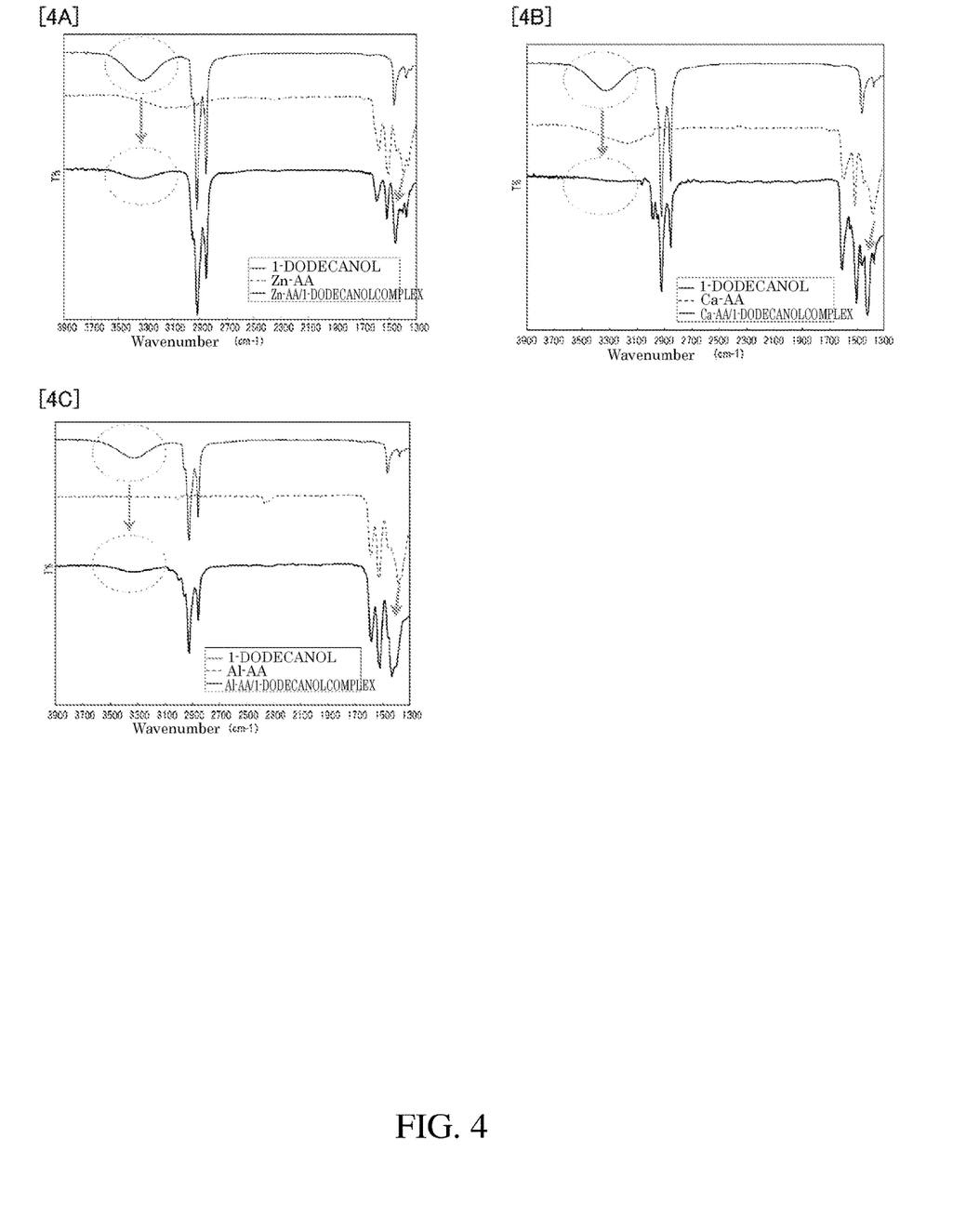
FIGS. 4A to 4C are diagrams showing changes in FT-IR spectra when an alkyl alcohol is added to three types of β-diketonato metal complexes.

FIGS. 4A to 4c show measured FT-IR spectra. As the β-diketonato metal complex, Zn-AA is used in FIG. 4A, Ca-AA in FIG. 4B, and Al-AA in FIG. 4C. In each drawing, the uppermost thin line indicates 1-dodecanol, and the middle dashed line indicates the β-diketonato metal complex. The lowermost bold line indicates the prepared metal-containing additive.

In any of the measurement results in FIGS. 4A to 4C, the absorption peak of the O—H stretching vibration given by 1-dodecanol in the region from 3500 to 3300 $cm^{-1}$ is reduced as 1-dodecanol is mixed with the β-diketonato metal complex, as indicated by the dashed ellipse. This phenomenon means that the O—H bond of the hydroxyl group of the alcohol has disappeared, suggesting that the alcohol has coordinated to the metal in a form of an alkoxy ligand. Specifically, it is considered that the O—H bond of the R—O—H structure (R is an alkyl group) of the alkyl alcohol disappeared, and a bond in a form of R-O-M (M is a metal) was generated.

Furthermore, the absorption peak of the C=O stretching vibration of each β-diketonato metal complex at around 1380 $cm^{-1}$ shifts to a higher wavenumber side with mixing with 1-dodecanol, as indicated by an arrow in each drawing. The peak shift of the C=O stretching vibration indicates that the 1-dodecanol changes the state of the coordination bond between the β-diketonato ligand and the central metal. This means a change of the coordination environment of the central metal. Considering this together with the disappearance of the O—H bond, it is suggested that 1-dodecanol is re-coordinated as an alkoxy ligand to the β-diketonato metal complex.

Although one embodiment of the invention has been described in detail hereinbefore, the disclosure is not limited to the embodiment, and various modifications can be made without departing from the gist of the disclosure.

LIST OF REFERENCE SIGNS

1 Covered wire with terminal
2 Covered wire
2a Covered wire tip end
3 Wire conductor
3a Strand
4 Insulation coating (insulator)
5 Terminal fitting
5a Edge of terminal fitting
5b Side of terminal fitting
5c Back of terminal fitting
51 Connection
52 Wire barrel
53 Insulation barrel
54 Wire fixture
6 Electrical connection
7 Cured product
10 Metal member
12 Metal base
14 Coating material

The invention claimed is:

1. A metal member, comprising:
   I. a metal base; and
   II. a coating material covering a surface of the metal base, wherein the coating material comprises a crosslinked product of a crosslinkable polymer composition, the crosslinkable polymer composition comprising
      i. a metal-containing additive, the metal-containing additive comprising:
         (A) a β-diketonato metal complex; and
         (B) a primary alkyl alcohol having 4 to 30 carbon atoms; and
      ii. an uncrosslinked organic polymer, wherein the uncrosslinked organic polymer has a substituent capable of forming ionic bonds with metal ions released by heat from the metal-containing additive during crosslinking of the organic polymer, and
      wherein in the crosslinked product of the crosslinkable polymer composition, the organic polymer is crosslinked via metal ions released from the metal-containing additive during crosslinking of the organic polymer.

2. The metal member according to claim 1, wherein the alkyl alcohol is a linear alkyl alcohol.

3. The metal member according to claim 1, wherein the amount of the alkyl alcohol in the metal-containing additive is twice or more in molar ratio, the amount of the β-diketonato metal complex.

4. The metal member according to claim 1, wherein the β-diketonato metal complex comprises at least one metal selected from the group consisting of an alkaline earth metal, zinc, titanium, and aluminum.

5. The metal member according to claim 1, wherein at least part of the alkyl alcohol coordinates to metal atoms of the β-diketonato metal complex.

6. The metal member according to claim 1, wherein the metal-containing additive has higher storage stability than the β-diketonato metal complex, and metal ions are released at a temperature of 50° C. or higher and 200° C. or lower.

7. The metal member according to claim 1, wherein the substituent of the organic polymer is at least one selected from the group consisting of a carboxylic acid group, an acid anhydride group, a phosphoric acid group, and a sulfonic acid group.

8. The metal member according to claim 7, wherein the organic polymer is liquid at 150° C. or lower.

9. The metal member according to claim 1, wherein the crosslinkable polymer composition comprises 0.2 parts by mass or more and 30 parts by mass or less of the metal-containing additive with respect to 100 parts by mass of the organic polymer.

10. A wire harness, comprising
a crosslinked product of a crosslinkable polymer composition,
the crosslinkable polymer comprising
   i. a metal-containing additive, the metal-containing additive comprising:
     (A) a β-diketonato metal complex; and
     (B) a primary alkyl alcohol having 4 to 30 carbon atoms, and
   ii. an uncrosslinked organic polymer, wherein the uncrosslinked organic polymer has a substituent capable of forming ionic bonds with metal ions released by heat from the metal-containing additive during crosslinking of the organic polymer and wherein in the crosslinked product of the crosslinkable polymer composition, the organic polymer is crosslinked via metal ions released from the metal-containing additive during crosslinking of the organic polymer.

11. The wire harness according to claim 10, wherein the alkyl alcohol is a linear alkyl alcohol.

12. The wire harness according to claim 10, wherein the amount of the alkyl alcohol in the metal-containing additive is twice or more in molar ratio, the amount of the β-diketonato metal complex.

13. The wire harness according to claim 10, wherein the β-diketonato metal complex comprises at least one metal selected from the group consisting of an alkaline earth metal, zinc, titanium, and aluminum.

14. The wire harness according to claim 10, wherein at least part of the alkyl alcohol coordinates to metal atoms of the β-diketonato metal complex.

15. The wire harness according to claim 10, wherein the metal-containing additive has higher storage stability than the β-diketonato metal complex, and metal ions are released at a temperature of 50° C. or higher and 200° C. or lower.

16. The wire harness according to claim 10, wherein the substituent of the organic polymer is at least one selected from the group consisting of a carboxylic acid group, an acid anhydride group, a phosphoric acid group, and a sulfonic acid group.

17. The wire harness according to claim 10, wherein the organic polymer is liquid at 150° C. or lower.

18. The wire harness according to claim 10, wherein the composition comprises 0.2 parts by mass or more and 30 parts by mass or less of the metal-containing additive with respect to 100 parts by mass of the organic polymer.

\* \* \* \* \*